US009122490B2

(12) United States Patent
Fanning et al.

(10) Patent No.: US 9,122,490 B2
(45) Date of Patent: Sep. 1, 2015

(54) CODE DEPENDENCY CALCULATION

(71) Applicant: Microsoft Corporation, Redmond, WA (US)

(72) Inventors: Michael C. Fanning, Redmond, WA (US); Christopher M. H. Faucon, Redmond, WA (US); Matthew Thornhill Hall, Seattle, WA (US); Nachiappan Nagappan, Redmond, WA (US); Benjamin Livshits, Kirkland, WA (US); Magnus Madsen, Arahus (DK)

(73) Assignee: Microsoft Technology Licensing, LLC, Redmond, WA (US)

( * ) Notice: Subject to any disclaimer, the term of this patent is extended or adjusted under 35 U.S.C. 154(b) by 194 days.

(21) Appl. No.: 13/654,165

(22) Filed: Oct. 17, 2012

(65) Prior Publication Data

US 2014/0109106 A1    Apr. 17, 2014

(51) Int. Cl.
*G06F 9/46* (2006.01)
*G06F 9/45* (2006.01)
*G06F 9/44* (2006.01)

(52) U.S. Cl.
CPC . *G06F 8/433* (2013.01); *G06F 8/75* (2013.01)

(58) Field of Classification Search
None
See application file for complete search history.

(56) References Cited

U.S. PATENT DOCUMENTS

| | | | | |
|---|---|---|---|---|
| 5,872,973 | A | 2/1999 | Mitchell et al. | |
| 5,929,864 | A * | 7/1999 | Picott et al. | 345/440 |
| 7,039,923 | B2 | 5/2006 | Kumar et al. | |
| 8,516,443 | B2 * | 8/2013 | Li et al. | 717/123 |
| 2005/0166193 | A1 | 7/2005 | Smith et al. | |
| 2005/0204344 | A1 * | 9/2005 | Shinomi | 717/124 |
| 2010/0079462 | A1 * | 4/2010 | Breeds et al. | 345/440 |
| 2013/0145347 | A1 * | 6/2013 | Karr et al. | 717/113 |
| 2014/0019949 | A1 * | 1/2014 | Craymer | 717/150 |

OTHER PUBLICATIONS

Brown et al, An Active Approach to Characterizing Dynamic Dependencies for Problem Determination in a Distributed Application Environment, IEEE, 2001, pp. 1-13.*
Deng et al. Weighted System Dependency Graph, IEEE Apr. 2012, pp. 380-389.*
Kalnis et al., Mizan: Optimizing Graph Mining in Large Parallel Systems, King Abdullah Unibersity of Science and Technology, Mar. 2012, 12 pages.*
Mairhofer, Stefan, "Search-based Software Testing and Complex Test Data Generation in a Dynamic Programming Language", Published on: Jun. 2008, Available at: http://www.cse.chalmers.se/~feldt/teaching/master_theses/mairhofer_2008_bth_masterthesim_final.pdf.
Chen, et al., "Improving Graph-based Dependency Parsing with Decision History", In 23rd International Conference on Computational Linguistics, Aug. 2010, 9 pages.
Pinzger, et al., "A Tool for Visual Understanding of Source Code Dependencies", In 16th IEEE International Conference on Program Comprehension, Jun. 10, 2008, 6 pages.
"International Search Report & Written Opinion for PCT Patent Application No. PCT/US2013/065499", Mailed Date: Feb. 11, 2014, Filed Date: Oct. 17, 2013, 7 Pages.
Aho, et al., "Chapter 5: Syntax-Directed Translation—Evaluation Orders for SDD's", In Book—Compilers: Principles, Techniques, and Tools, Sep. 10, 2006, pp. 310-314.

* cited by examiner

*Primary Examiner* — Diem Cao
(74) *Attorney, Agent, or Firm* — Kevin Sullivan; Aaron Hoff; Micky Minhas

(57) ABSTRACT

Generation of a dependency graph for code that includes code portions such as resources or functions or both. For some or all of the nodes, the dependency is calculated by determining that the given node, a depending node, depends on an affecting node. The dependency is recorded so as to be associated with the node. Furthermore, the dependency calculation method is recorded so as to be associated with the dependency. The code may perhaps include portions within two different domains, in which the mechanism for calculating dependencies may differ. In some cases, the dependency graph may be constructed in stages, and perhaps additional properties may be associated with the node, and metadata of the properties may also be recorded.

24 Claims, 12 Drawing Sheets

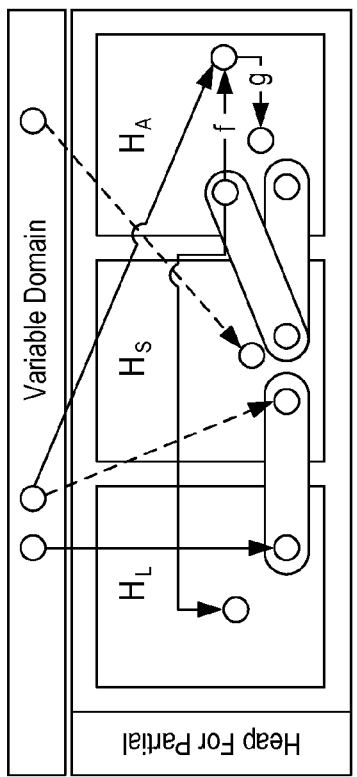
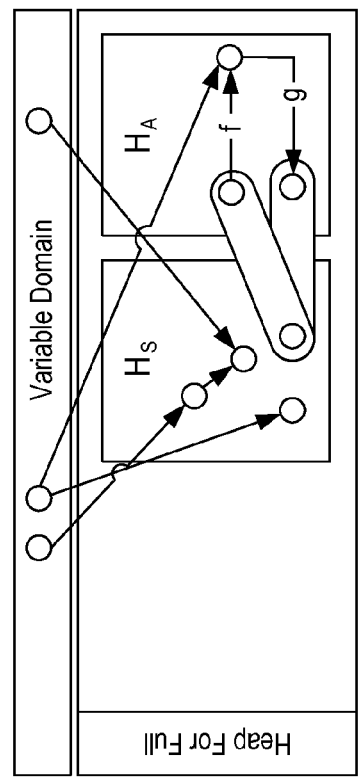
Figure 9A
Figure 9B

| | |
|---|---|
| NEWOBJ($v : V, h : H, f : H$) | object instantiation |
| ASSIGN($v_1 : V, v_2 : V$) | variable assignment |
| LOAD($v_1 : V, v_2 : V, p : P$) | property load |
| STORE($v_1 : V, p : P, v_2 : V$) | property store |
| FORMALARG($f : H, z : Z, v : V$) | formal argument |
| FORMALRET($f : H, v : V$) | formal return |
| ACTUALARG($c : C, z : Z, v : V$) | actual argument |
| ACTUALRET($c : C, v : V$) | actual return |
| CALLGRAPH($c : C, f : H$) | indicates that $f$ may be invoked by a call site $c$ |
| POINTSTO($v : V, h : H$) | indicates that $v$ may point to $h$ |
| HEAPPTSTO($h_1 : H, p : P, h_2 : H$) | indicates that $h_1$'s $p$ property may point to $h_2$ |
| PROTOTYPE($h_1 : H, h_2 : H$) | indicates that $h_1$ may have $h_2$ in its internal prototype chain |

*Figure 10*

$\text{POINTSTO}(v, h)$ :- $\text{NEWOBJ}(v, h, \_)$.
$\text{POINTSTO}(v_1, h)$ :- $\text{ASSIGN}(v_1, v_2), \text{POINTSTO}(v_2, h)$.
$\text{POINTSTO}(v_2, h_2)$ :- $\text{LOAD}(v_2, v_1, p), \text{POINTSTO}(v_1, h_1), \text{HEAPPTSTO}(h_1, p, h_2)$.

$\text{HEAPPTSTO}(h_1, p, h_2)$ :- $\text{STORE}(v_1, p, v_2), \text{POINTSTO}(v_1, h_2), \text{POINTSTO}(v_2, h_2)$.
$\text{HEAPPTSTO}(h_1, p, h_3)$ :- $\text{PROTOTYPE}(h_1, h_2), \text{HEAPPTSTO}(h_2, p, h_3)$.
$\text{PROTOTYPE}(h_1, h_2)$ :- $\text{NEWOBJ}(\_, h_1, v), \text{POINTSTO}(v, f), \text{HEAPPTSTO}(f, "\text{prototype}", h_3)$.

$\text{CALLGRAPH}(c, f)$ :- $\text{ACTUALARG}(c, 0, v), \text{POINTSTO}(v, f)$.
$\text{ASSIGN}(v_1, v_2)$ :- $\text{CALLGRAPH}(c, f), \text{FORMALARG}(f, i, v_1), \text{ACTUALARG}(c, i, v_2), z > 0$.
$\text{ASSIGN}(v_2, v_1)$ :- $\text{CALLGRAPH}(c, f), \text{FORMALRET}(f, v_1), \text{ACTUALRET}(c, v_2)$.

*Figure 11A*

$$\text{ResolvedVariable}(v) :- \text{PointsTo}(v, \_).$$
$$\text{PrototypeObj}(h) :- \text{Prototype}(\_, h).$$

$$\text{DeadArgument}(f, i) :- \text{FormalArg}(f, i, v), \neg \text{ResolvedVariable}(v), \text{AppAlloc}(f), i > 1.$$
$$\text{DeadReturn}(c, v_2) :- \text{ActualArg}(c, 0, v_1), \text{PointsTo}(v_1, f), \text{ActualRet}(c, v_2),$$
$$\neg \text{ResolvedVariable}(v_2), \neg \text{AppAlloc}(f).$$

$$\text{DeadLoad}(h, p) :- \text{Load}(v_1, v_2, p), \text{PointsTo}(v_2, h), \neg \text{HasProperty}(h, p), \text{AppVar}(v_1), \text{AppVar}(v_2).$$
$$\text{DeadLoad}(h_2, p) :- \text{Load}(v_1, v_2, p), \text{PointsTo}(v_2, h_1), \text{Prototype}(h_1, h_2),$$
$$\neg \text{HasProperty}(h_2, p), \text{Symbolic}(h_2), \text{AppVar}(v_1), \text{AppVar}(v_2).$$
$$\text{DeadLoadDynamic}(v_1, h) :- \text{LoadDynamic}(v_1, v_2), \text{PointsTo}(v_2, h), \neg \text{ResolvedVariable}(v_1),$$
$$\text{AppVar}(v_1), \text{AppVar}(v_2).$$

$$\text{DeadPrototype}(h_1) :- \text{NewObj}(\_, h, v), \text{PointsTo}(v, f), \text{Symbolic}(f), \neg \text{HasSymbolicPrototype}(h).$$

$$\text{CandidateObject}(h_1, h_2) :- \text{DeadLoad}(h_1, p), \text{HasProperty}(h_2, p), \text{Symbolic}(h_1), \neg \text{Symbolic}(h_2),$$
$$\neg \text{HasDynamicProps}(h_1), \neg \text{HasDynamicProps}(h_2), \neg \text{SpecialProperty}(p).$$
$$\text{CandidateProto}(h_1, h_2) :- \text{DeadLoad}(h_1, p), \text{HasProperty}(h_2, p), \text{Symbolic}(h_1), \neg \text{Symbolic}(h_2),$$
$$\neg \text{HasDynamicProps}(h_1), \neg \text{HasDynamicProps}(h_2), \text{PrototypeObj}(h_2).$$

$$\text{NoLocalMatch}(h_1, h_2) :- \text{Prototype}(h_2, h_3),$$
$$\forall p. \text{DeadLoad}(h_1, p) \Rightarrow \text{HasProperty}(h_2, p),$$
$$\forall p. \text{DeadLoad}(h_1, p) \Rightarrow \text{HasProperty}(h_3, p),$$
$$\text{CandidateProto}(h_1, h_2), \text{CandidateProto}(h_1, h_3), h_2 \neq h_3.$$

$$\text{UnifyProto}(h_1, h_2) :- \neg \text{NoLocalMatch}(h_1, h_2), \text{CandidateProto}(h_1, h_2).$$
$$\forall p. \text{DeadLoad}(h_1, p) \Rightarrow \text{HasProperty}(h_2, p).$$
$$\text{FoundPrototypeMatch}(h) :- \text{UnifyProto}(h, \_).$$
$$\text{UnifyObject}(h_1, h_2) :- \text{CandidateObject}(h_1, h_2), \neg \text{FoundPrototypeMatch}(h_1)$$
$$\forall p. \text{DeadLoad}(h_1, p) \Rightarrow \text{HasProperty}(h_2, p).$$

*Figure 11B*

INFERENCE(*constraints*, *facts*, *isFull*)
1  *relations* = SOLVE-CONSTRAINTS(*constraints*, *facts*)
2  repeat
3    *newFacts* = MAKE-SYMBOLS(*relations*, *isFull*)
4    *facts* = *facts* ∪ *newFacts*
5    *relations* = SOLVE-CONSTRAINTS(*constraints*, *facts*)
6  until *newFacts* == ∅

MAKE-SYMBOLS(*relations*, *isFull*)
1  *facts* = ∅
2  for $(h, p) \in$ *relations*.DEADLOAD : $H \times F$
3    if ¬SYMBOLIC($h$) or *isFull*
4      *facts* ∪ = new HEAPPTSTO($h, f,$ new $H$)
5  for $(f, i) \in$ *relations*.DEADARGUMENT : $H \times Z$
6    $v$ = FORMALARG$[f, i]$
7    *facts* ∪ = new POINTSTO($v,$ new $H$)
8  for $(c, v) \in$ *relations*.DEADRETURN : $C \times V$
9    *facts* ∪ = new POINTSTO($v,$ new $H$)
10  // Unification:
11  for $h \in$ *relations*.DEADPROTOTYPE : $H$
12    *facts* ∪ = new PROTOTYPE($h,$ new $H$)
13  for $(h_1, h_2) \in$ *relations*.UNIFYPROTO : $H \times H$
14    *facts* ∪ = new PROTOTYPE($h_1, h_2$)
15  for $(h_1, h_2) \in$ *relations*.UNIFYOBJECT : $H \times H$
16    for $(h_3, p, h_1) \in$ *relations*.HEAPPTSTO : $H \times P \times H$
17      *facts* ∪ = new HEAPPTSTO($h_3, p, h_2$)
18  return *facts*

*Figure 12*

CODE DEPENDENCY CALCULATION

BACKGROUND

Computing technology has transformed the way we work, play, and communicate. The functionality of computing systems is defined by the software code that they execute. Some code is quite straightforward. However, some code may be enormously complex, requiring large teams of skilled programmers in order to generate. In order to author complex code, it is helpful to partition the code into smaller pieces by defining simpler tasks for those smaller pieces, and allowing those pieces to interact. This is the purpose of object-oriented programming.

Accordingly, the program is written such that one code portion may have dependencies on another code portion. For instance, the second code portion may rely on input from the first code portion, or may be initiated only by a call from the first code portion. The first code portion may also be a resource, such as a file, that is required by the second code portion in order to execute. Thus, there may be dependencies at the file level also.

When evaluating the overall functioning and operation of a program, is it helpful to be able to view dependencies of the various code portions. Accordingly, there are existing mechanisms for constructing a dependency graph, modeling the code portions as nodes in the graph, and with the edges in the graph representing dependencies.

BRIEF SUMMARY

At least one embodiment described herein relates to the computer-assisted generation of a dependency graph for code that includes code portions. For instance, the code portions may include resources, such as files, functions, or combinations thereof. Each node in the dependency graph corresponds to a code portion of the code. For a given node, the dependency is calculated by determining that the given node, a depending node, depends on an affecting node. The dependency is recorded so as to be associated with the node. Furthermore, the dependency calculation method is recorded so as to be associated with the dependency.

The code may perhaps include portions within two different domains, in which the mechanism for calculating dependencies may differ. For instance, in one domain that uses static languages, perhaps static analysis is performed to calculate dependencies. In another domain that uses dynamic languages, perhaps runtime dynamic analysis is used to perform the dependency calculation. In some cases, the dependency graph may be constructed in stages. For instance, perhaps dependencies based on static analysis are performed first. Later, dynamic analysis may be performed to augment the graph. Furthermore, perhaps even iterations of dynamic analysis may be performed over time, with each iteration adding to the graph. In some embodiments, additional properties may be associated with the node, and metadata of the properties may also be recorded (such as how the property was calculated, the confidence and soundness of the property, and so forth).

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features can be obtained, a more particular description of various embodiments will be rendered by reference to the appended drawings. Understanding that these drawings depict only sample embodiments and are not therefore to be considered to be limiting of the scope of the invention, the embodiments will be described and explained with additional specificity and detail through the use of the accompanying drawings in which:

FIG. 9A shows a connection between variables and the heap $H = H_A \cup H_S \cup H_L$ in the context of partial inference;

FIG. 9B shows a similar connection between variables and the heap $H = H_A \cup H_S$ in the context of full inference, which lacks $H_L$;

FIG. 10 illustrates a set of facts in relations of fixed arity and type;

FIG. 11A illustrates rules for Andersen-style inclusion-based points-to analysis;

FIG. 11B illustrates inference rules for use analysis; and

FIG. 12 illustrates the use of symbolic locations into PointsTo and HeapPtsTo, and Prototype.

DETAILED DESCRIPTION

In accordance with embodiments described herein, the generation of a dependency graph for code is described. The code may include code portions such as resources or functions or both. For some or all of the nodes, the dependency is calculated by determining that the given node, a depending node, depends on an affecting node. The dependency is recorded so as to be associated with the node. Furthermore, the dependency calculation method is recorded so as to be associated with the dependency. The code may perhaps include portions within two different domains, in which the mechanism for calculating dependencies may differ. In some cases, the dependency graph may be constructed in stages, and perhaps additional properties may be associated with the node, and metadata of the properties may also be recorded.

Figure 1:
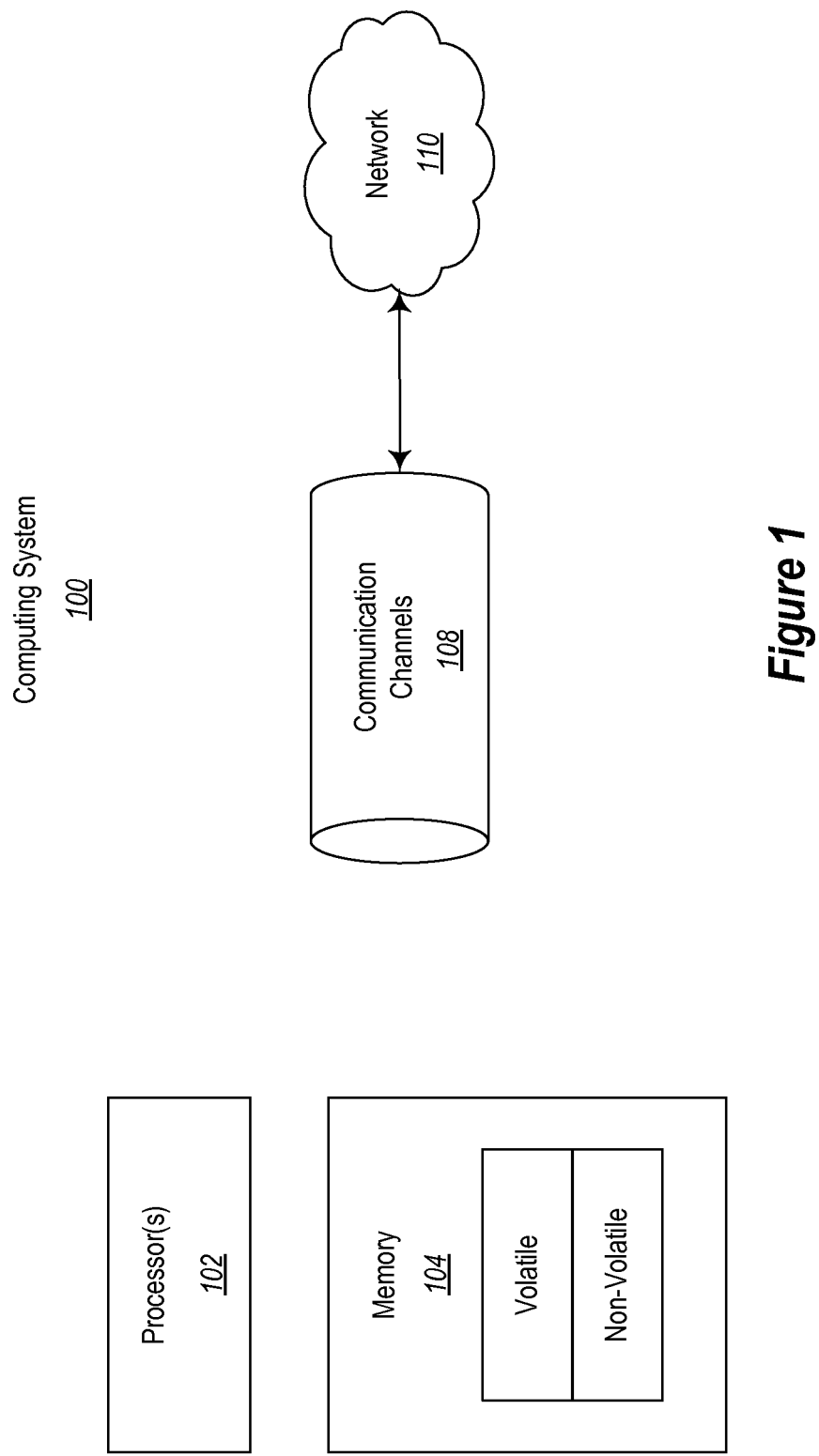
FIG. 1 illustrates an example computing system that may be used to employ embodiments described herein.

First, introductory discussion regarding computing systems is described with respect to FIG. 1. Computing systems are now increasingly taking a wide variety of forms. Computing systems may, for example, be handheld devices, appliances, laptop computers, desktop computers, mainframes, distributed computing systems, or even devices that have not conventionally been considered a computing system. In this description and in the claims, the term "computing system" is defined broadly as including any device or system (or combination thereof) that includes at least one physical and tangible processor, and a physical and tangible memory capable of having thereon computer-executable instructions that may be executed by the processor. The memory may take any form and may depend on the nature and form of the computing system. A computing system may be distributed over a network environment and may include multiple constituent computing systems.

As illustrated in FIG. 1, in its most basic configuration, a computing system 100 typically includes at least one processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well. As used herein, the term "module" or "component" can refer to software objects or routines that execute on the computing system. The different components, modules, engines, and services described herein may be implemented as objects or processes that execute on the computing system (e.g., as separate threads).

In the description that follows, embodiments are described with reference to acts that are performed by one or more computing systems. If such acts are implemented in software, one or more processors of the associated computing system that performs the act direct the operation of the computing system in response to having executed computer-executable instructions. An example of such an operation involves the manipulation of data. The computer-executable instructions (and the manipulated data) may be stored in the memory 104 of the computing system 100. Computing system 100 may also contain communication channels 108 that allow the computing system 100 to communicate with other message processors over, for example, network 110.

Embodiments described herein may comprise or utilize a special purpose or general-purpose computer including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: computer storage media and transmission media.

Computer storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer. In this description and in the claims, a "computer program product" includes one or more computer storage media having computer-executable instructions thereon that, when executed by the one or more processors of the computing system, perform the function of the computer program product.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Figure 2:
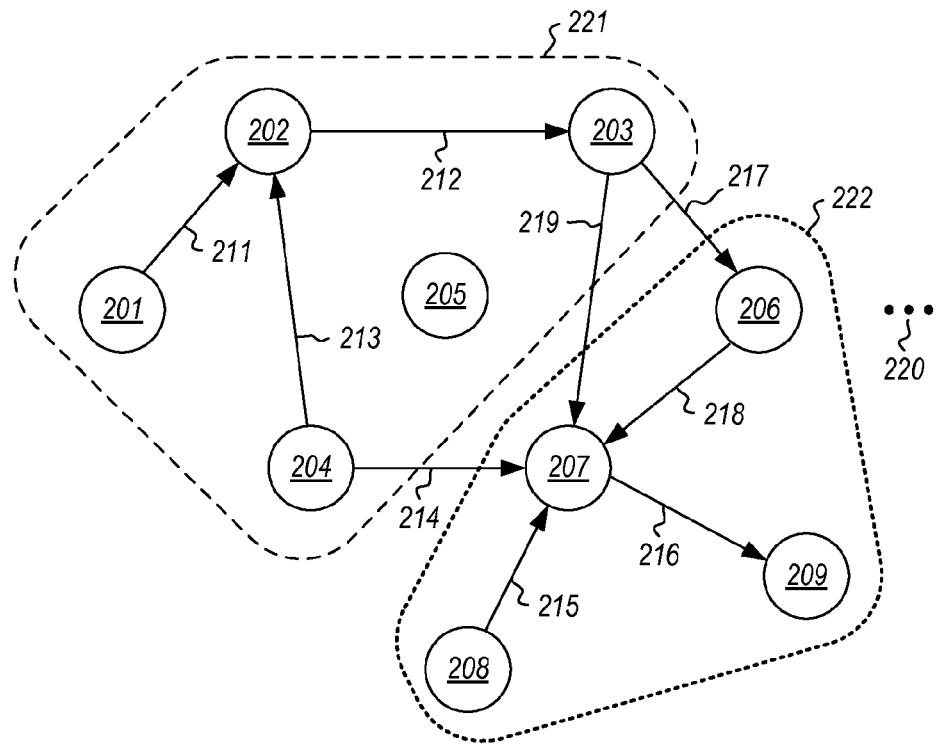
FIG. 2 illustrates a first example dependency graph that represents various dependencies within a computing program.

FIG. 2 illustrates a dependency graph 200 that represents various dependencies in a computer program. Dependency graphs will be different according to the computer program. There may be dependency graphs from as simple as the trivial case of a single node to as complex as thousands, or even perhaps millions of nodes. Accordingly, the dependency graph 200 should be viewed as an example only, and in no way limiting the broader principles described herein. This flexibility is abstractly represented by the ellipses 220 of FIG. 2. Furthermore, in dynamic language programs, the dependency graph may itself be dynamic.

The dependency graph 200 includes nine nodes 201 through 209. Each node is a data structure and corresponds to a code portion in a computer program. In this description and in the claims, a "code portion" is to be interpreted broadly as including any part of a computer program, whether computer-executable instructions or data. For instance, the code portion might be a resource, such as a file or set of files. On the other hand the code portion might be a function, code snippet, object, or any other code segment. In the case of a dependency graph in which each node represents a function, and each dependency is a function call, the dependency graph may be referred to as a "call graph".

The code portion may be coded in static language or dynamic language. Static language programs often have a well-defined type structure. In dynamic language programs, on the other hand, the type system is not well-defined, and it is often difficult to tell where a type of a variable was even established. Further, in dynamic languages, a single variable can have different types dependent on where the execution is in the code. In addition, the type of a variable at a particular location in the code may change over time in dynamic language programs. For instance, a parameter dereference may have its type changed between one or more calls. Accordingly, the analysis of a dynamic language program can prove to be quite challenging, as such dynamic language programs do not lend themselves to static analysis. Examples of dynamic language programs include scripting languages such as Javascript, Visual Basic Scripting Edition (VBScript), and many others.

Returning to FIG. 2, the dependency graph 200 has edges (represented by arrows) that represent a dependency between two nodes. The node at the tail of the arrow is the node (also called herein an "affecting node" when referencing the particular dependency) that corresponds to the code portion (also called herein an "affecting code portion") that satisfies the dependency for the code portion (also called herein a "depending code portion") corresponding to the node (also called herein a "depending node") at the head of the arrow. For instance, with respect to edge 211, node 201 is the affecting node and node 202 is the depending node. With respect to edge 212, node 202 is the affecting node and node 203 is the depending node. Furthermore, edge 213 shows that node 202 depends from node 204, edge 214 shows that node 207 depends from node 204, edge 215 shows that node 207 depends from node 208, edge 216 shows that node 209 depends from node 207, edge 217 shows that node 206 depends from node 203, edge 218 shows that node 207 depends from node 206, and edge 219 shows that node 207 depends from node 203. Note that node 205 has no detected dependencies from any other node, nor does node 205 affect any other node.

Figure 3:
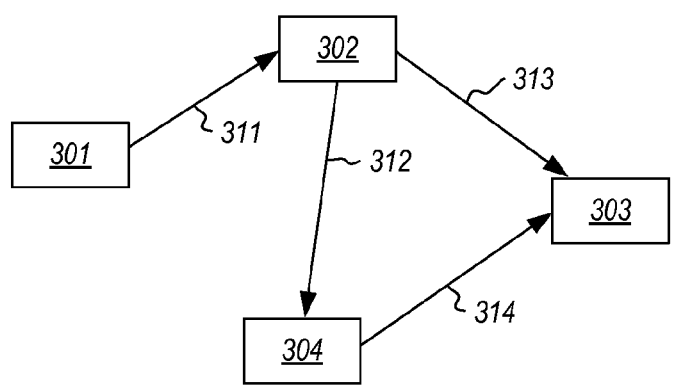
FIG. 3 illustrates a second example dependency graph that represents various dependencies that may perhaps exist at a different granular level than the first example dependent graph of FIG. 2.

FIG. 3 illustrates another dependency graph in which there are four nodes 301 through 304, and with edges 311 through 314 showing the relative dependencies. In some embodiments, different dependency graphs are overlaid upon each other. As an example, suppose that dependency graph 300 is a higher level dependency graph showing dependencies between files. Thus, nodes 301 through 304 may each represent a corresponding file. Now suppose that dependency graph 200 represents function-level interaction within the file represented by node 302. The other files might have corresponding function level dependency graphs that interact at the function-level with functions in other files. The fact that the nodes of FIG. 3 may be represented at different levels than the node of FIG. 2 is abstractly represented by the nodes of FIG. 3 having a different shape (i.e., rectangular) as compared to the nodes of FIG. 2(i.e., circular). Thus, in a sense, as FIGS. 2 and 3 illustrate, some embodiments do not merely construct a single graph, but rather an overlay of multiple graphs, such as 300 and 200, which could be thought of as a database of graph nodes and edges in which nodes are interrelated with each other in a single graph, as well as interrelated with one or more other graphs at different levels (e.g., graph 300 is a higher level dependency graph than graph 200, as noted above).

For instance, there could be a file/binary code container graph of dependencies at one level. However, there might also be a call graph that could contain a node for all functions and every call target. Either of these dependency graphs could be organize by application versus library code. The APIs that are callable by some implied runtime condition required to use them might also be represented in the dependency graphs. For instance, the runtime condition might be that there is a webcam available and that the user has given permission to use the webcam. The various nodes in the dependency graphs could be annotated with properties and/or metadata that could help reorganize, construct, and/or permit traversal of the dependency graph at the appropriate level.

Referring again to FIG. 2, some of the nodes 201 through 205 are located in a first domain 221, and others of the nodes 206 through 209 are located in a second domain 222. Which domain a particular node is located in may have impact on how the dependencies are calculated, and/or on how other properties of the node are calculated.

As an example, suppose the domain 221 is a static language domain meaning that the constituent nodes represent code portions that are created from static language programs. In that case suppose the domain 222 is a dynamic language domain meaning that the constituent nodes represent code portions that are created from dynamic language programs. Static analysis is effective for static language programs, but dynamic runtime analysis is used for dynamic language programs. As another example, suppose that domain 221 contains nodes that are nodes that represent an application program, whereas domain 222 contains nodes that represent portions of the operating system.

There will be a somewhat detailed discussion of dependencies before the description returns reference to the figures. Dependencies may be learned from in-source comments that describe dependencies (such as utilization of an external framework library such as JQuery), dependencies that can be determined statically from actual code (such as dynamic insertion of a <script> element with a specific URL), and/or code that dynamically loads script which cannot be statically determined (described further below), and so forth.

As for implied dependencies, there are several categories of callable API that are not expressed as code that is parsed/interpreted/executed by a runtime. These include 1) DOM API, 2) other external API, and 3) surrogate code. Each will now be explained.

As for surrogate code, in some cases, for perhaps reasons of performance, convenience, or security, source code that exists and is actually parsed/executed in real world execution might be replaced by surrogate JavaScript code that can be executed in context of the language.

Absent a well-maintained and properly ordered set of in-source annotations describing a JS file's dependencies, an HTML file that consumes some JavaScript can be very helpful for determining references as well as proper ordering of file load (since any HTML file organizes its script elements properly in order for code to execute correctly). JavaScript files may provide a reference to an HTML file that consumes it in order to identify what other JS code it might depend on and in what order they should load. This can save significant developer maintenance costs. HTML also can contain embedded code (e.g., within <script> elements or as embedded script associated with event handlers) that should be extracted and passed to the language service (since a file under edit might itself depend on this code). Finally, some browsers populate the JS callable API with variables that represent HTML elements expressed in the mark-up. In Internet Explorer, for example, any div marked with an id can be referred to from JavaScript directly by that id (rather than acquiring it via getElementById). For this case, the HTML would be parsed looking for elements with an ID and then construct surrogate JS that populates the global namespace with the appropriate set of identifiers. Similarly, a dymanic analysis might walk the DOM at a specific point in time in order to identify elements marked with an "id".

These categories are useful for driving user experience/configuration, potentially dictate handling in the general framework itself and could imply special handling in a language service provider. Users might configure a project for a web application as targeting only a specific version of a browser. As mentioned, the infrastructure might treat external code with more care than trusted application code. When calculating a closure of dependencies that might be in play for editing a specific file, the infrastructure might also make decisions based on these categorizations. The downloader might not aggressively parse external files, for example, for a complete closure of its possible dependencies but depend instead on the hooks in the engine to identify when that external code itself pulls in other files.

Figure 4:
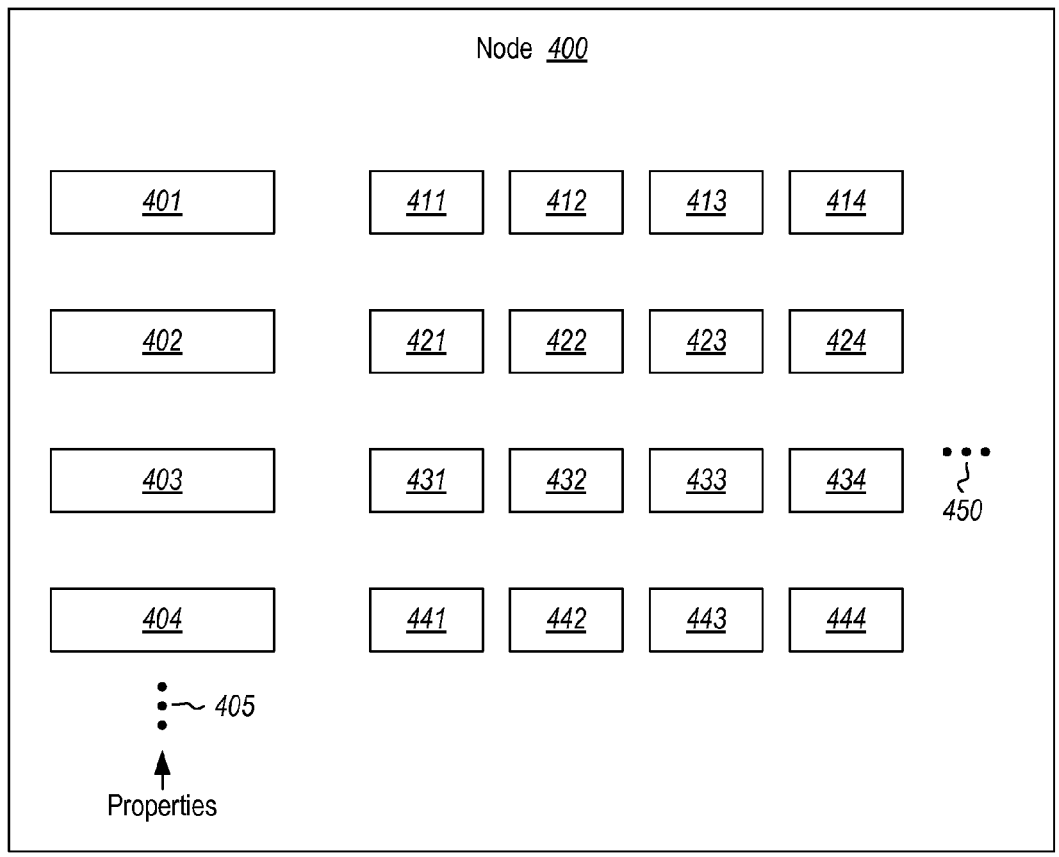
FIG. 4 abstractly illustrates an example node data structure that includes properties of the node, including perhaps a dependency property, as well as various characteristics about each of the properties.

Returning to the figures, FIG. 4 abstractly illustrates a node data structure 400. The node 400 includes properties 401 through 404, although the ellipses 405 represents flexibility in the number and types of properties that node 400 may represent. Each property represents facts about the code portion corresponding to the node 400. Each property may have zero or more properties (i.e., metadata) describing facts about the corresponding property. For instance, metadata 411 through 414 describe metadata of the corresponding property 401, metadata 421 through 424 describe metadata of the corresponding property 402, metadata 431 through 434 describe metadata of the corresponding property 403, and metadata 441 through 444 describe metadata of the corresponding property 404. The ellipses 450 represents great flexibility in the number and types of metadata corresponding to each property, and further that the number and type of metadata describing different properties need not be the same for each property.

An example of a node property includes a dependency. For instance, suppose property 401 describes which nodes, if any, the node 400 depends from. Other examples of properties include a content characteristic of the depending code portion. For instance, the properties might be whether or not a particular code pattern is found within the corresponding code portion, or whether or not certain coding policy has been complied with.

The properties might include one or more predicted consequences for executing the code portion. For instance, analysis might conclude that a sensitive memory location is accessed, and the network is used, or some other result of execution.

The properties might include a language use characteristic of the code portion. For instance, they might report whether or not a certain language construct (such as "eval") has been used.

The properties might also include a source characteristic of the code portion. For instance, they might report which file loaded the component.

Metadata, on the other hand, is not properties about the code portion, but properties about the properties 401 through 404. As examples, the metadata might include information regarding how the calculated property was calculated, a confidence level in how the calculated property was calculated, a soundness level in how the calculated property was calculated, one or more conditions of the calculated property, and so forth.

Figure 5:
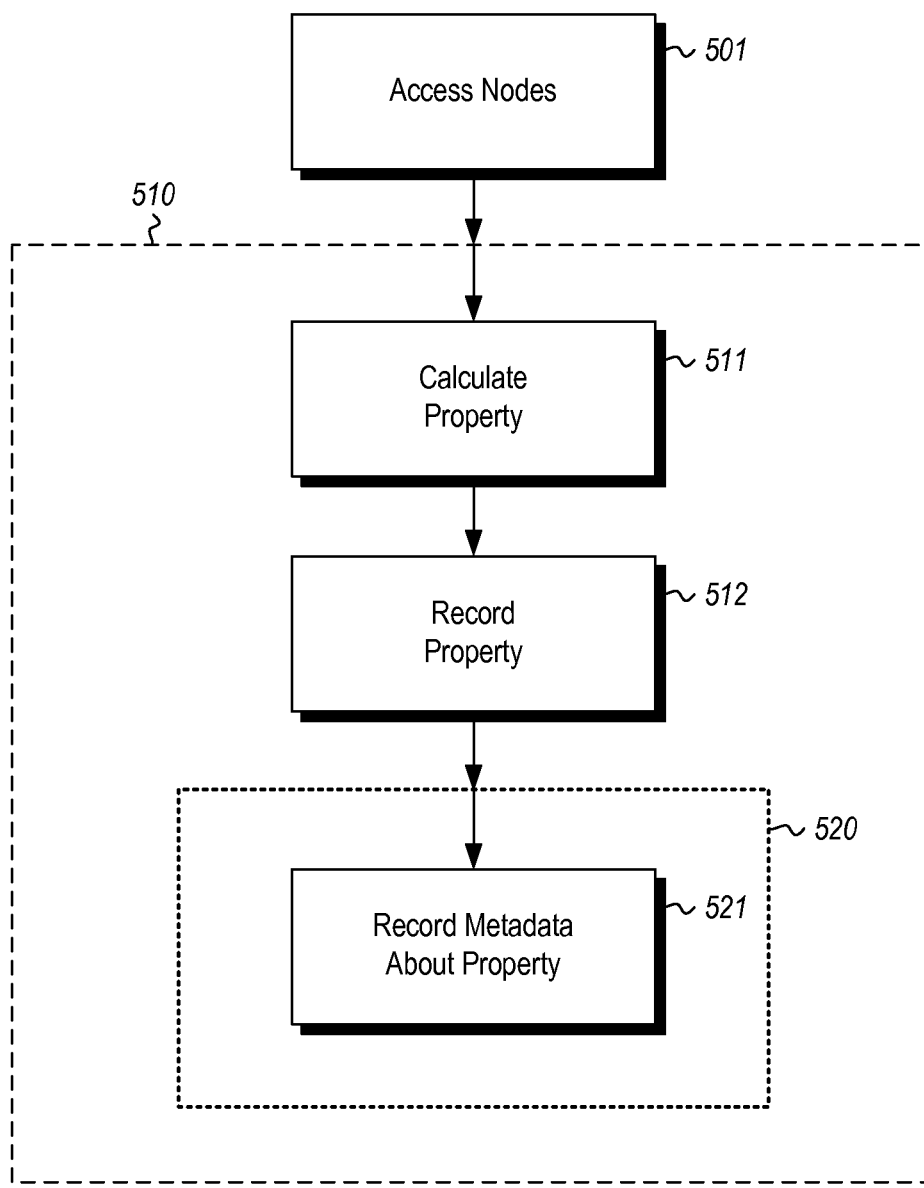
FIG. 5 illustrates a flowchart of a method for generating a dependency graph in accordance with the principles described herein.

FIG. 5 illustrates a flowchart of a method 500 for generating a dependency graph. The nodes are accessed (act 501). Part of the node identities of the program code may be previously known and/or part of the node identities of the program code may be identified during the analysis itself. Regardless, the node's identities are accessed. The contents of the dashed lined box 510 are then performed for each node, and for each property to be constructed for the node.

Specifically, the property is calculated for the respective node by determining or estimating facts about the node (act 511). For instance, dependency is calculated upon determining that the given node, a depending node, depends from an affecting node. The property (e.g., the dependency) is then recorded (act 512) in a manner associated with the node. For instance, referencing FIG. 4, the properties 401 through 404 are recorded inside the node data structure 400. The contexts of dotted lined box 520 are then performed for each item of metadata associated with the property. The metadata is then recorded (act 521) in a manner associated with the property.

A dependency graph constructed in this way has the potential to become a powerful tool for program analysis. For instance, as just a few examples of use, a reachability analysis might be performed to verify whether there is a possibility of memory access violations (e.g., accessing the same resource at the same time). The dependency graph may be used to clean up the program. In FIG. 2, for example, node 205 shows likelihood that the corresponding code portion may be removed from the program with no consequence. The dependency graph may also be used to minimize material that is copied from one program to another. In FIG. 2, for example, if the code portion corresponding to node 202 is to be copied to another program to another, the entire program need not be copied, just the corresponding code portions for the node 202 and its two affecting nodes 201 and 204. The dependency graph may also be used to evaluate the impact or effect of a change. In FIG. 2, for example, if the code in node 203 is changed then it has an effect on nodes 203, 206 and 207. This effect has repercussions on retesting components and the stability of a system.

The dependency graph may be constructed in multiple stages. The described structure enables this to happen. For instance, some of the code portions may be identified, and some of the dependencies may be identified in an earlier stage, whereas additional nodes and dependencies may be identified (and perhaps prior identified dependencies may be nullified), in response to subsequent stages.

Figure 6:
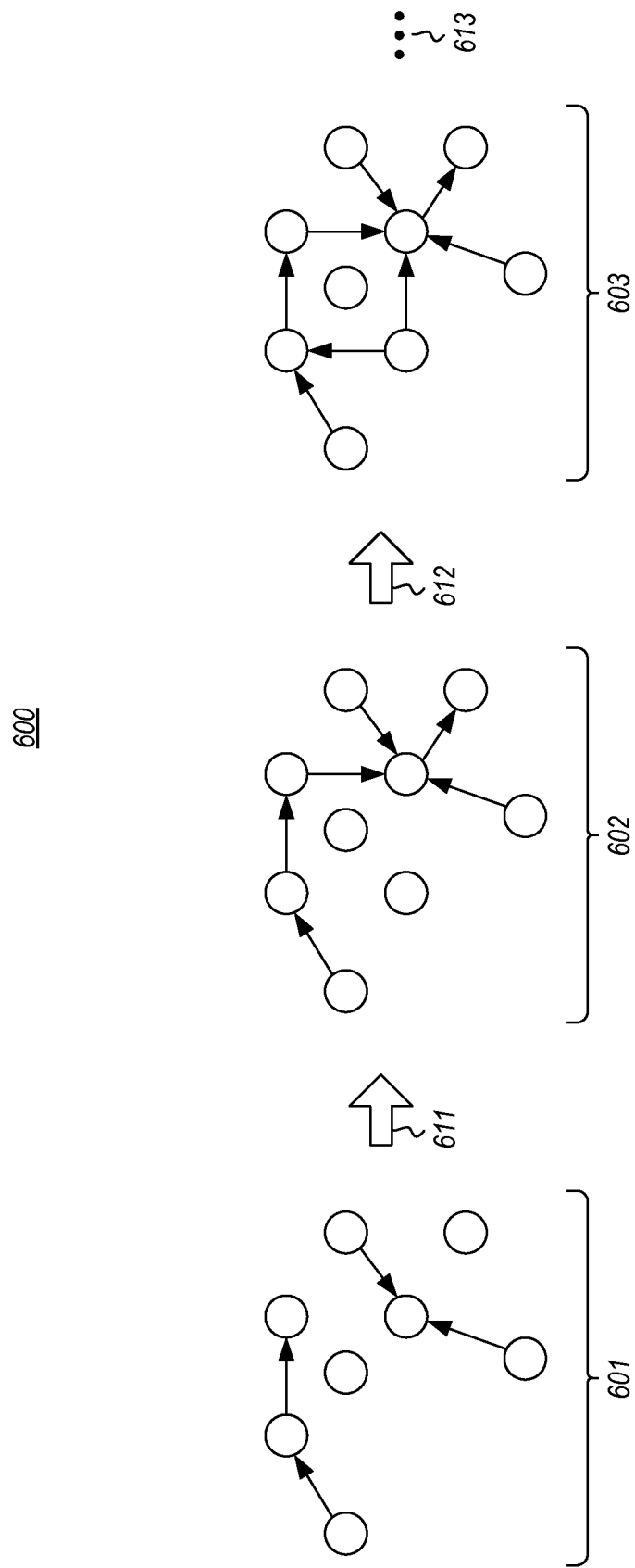
FIG. 6 illustrates a flow in which the dependency graph is generated over time in various stages.

FIG. 6 illustrates a sequence 600 of three stages 601, 602, 603 of dependency graph construction. Ellipses 613, however, represents that there may be many stages of dependency graph construction. Method 500 may be performed at each stage. The dependency graph shown in sequence 600 is analogous to the dependency graph of FIG. 2 in that the ultimate result is the same.

In the first stage 601, only 8 of the 9 nodes are properly identified. Furthermore, only 4 dependencies are identified. Moving (see arrow 611) to the second stage 602, all 9 of the nodes are now identified, and an additional 2 dependencies (making 6 total) have now been identified. Moving (see arrow 612) to the third stage 603, an additional two dependencies have been identified resulting in 9 total, thereby arriving at the dependency graph 200 of FIG. 2. In addition to the identity of the nodes themselves and the corresponding dependency, other properties may change as well. In addition, the metadata about the properties may change. For instance, a confidence level associated with a property may grow stronger with each additional stage of analysis.

This represents a kind of learning process where information learned from prior analysis may be used in subsequent analysis, and other information known for the current analysis (e.g., the runtime environment in case of dynamic analysis) may be leveraged in the current analysis. As an example, perhaps stage 601 represents a static analysis of the program. Stage 602 might represent a first iteration of dynamic analysis, and stage 603 might represent a second iteration of dynamic analysis.

Accordingly, the principles described herein describe a flexible structure for determining a dependency graph, and providing queryable information associated with each node in the dependency graph. Now, a more specific way of formulating a dependency graph for dynamic language programs (e.g., specifically Javascript) will be described.

1. Analysis Challenges

Before proceeding further, the challenges faced in performing static analysis when trying to analyze JavaScript applications that depend on libraries will now be described.

1.1 Whole Program Analysis

Whole program analysis in JavaScript has long been known to be problematic. Indeed, libraries such as the Browser API, the HTML DOM, node:js (written in either in C++ or Javascript) and the WINDOWS 8 API are all implemented in native languages such as C and C++. These implementations are therefore often simply unavailable to static analysis. Since no JavaScript implementation exists, static analysis tool authors are often forced to create stubs. This, however, brings in the issues of stub completeness and correctness (as well as development costs). Finally, JavaScript code frequently uses dynamic code loading, requiring static analysis at runtime, further complicating whole-program analysis.

1.2 Underlying Libraries and Frameworks

While analyzing code that relies on rich libraries has been recognized as a challenge for languages such as Java, JavaScript presents a set of unique issues.

Complexity: Even if the application code is well-behaved and amenable to analysis, complex JavaScript applications frequently use libraries such as jQuery and Prototype. While these are implemented in JavaScript, they present their own challenges because of extensive use of reflection such as eval or computed property names. Recent work has made some progress towards understanding and handling eval, but these approaches are still fairly limited and do not fully handle all the challenges inherent to large, complex applications.

Scale of libraries: Underlying libraries and frameworks are often very large. In the case of Windows 8 applications, they are tens of thousands of lines of code, compared to several thousand for applications on average. Requiring them to be analyzed every time an application is subjected to analysis results in excessively long running times for the static analyzer.

1.3 Tracking Interprocedural Flow

Points-to analysis selectively embeds an analysis of interprocedural data flow to model how data is copied across the program. However, properly modeling interprocedural data flow is a formidable task.

Containers: The use of arrays, lists, maps, and other complex data structures frequently leads to conflated data flow in static analysis; an example of this is when analysis is not able to statically differentiate distinct indices of an array. This problem is exacerbated in JavaScript because of excessive use of the DOM, which can be addressed both directly and through tree pointer traversal. Similarly, the HTML DOM, jQuery and other libraries provide a variety of ways to query the DOM indirectly. For instance document:body is a direct lookup, whereas document:getElementsByName("body") [0] is an indirect lookup. Such indirect lookups present special challenges for static analyses because they require explicit tracking of the association between lookup keys and their values. This problem quickly becomes unmanageable when CSS selector expressions are considered (e.g., as in the use of the jQuery $( ) selector function), as this would require the static analysis to reason about the whole tree structure of the HTML page. This is especially problematic for insensitive analyses, where trees are likely to collapse into more or less fully connected graphs.

Reflective calls: Another typical challenge of analyzing JavaScript code stems from reflective calls into application code being "invisible". As a result, callbacks within the application invoked reflectively will have no actuals linked to their formal parameters, leading to variables within these callback functions having empty points-to sets.

1.4 Soundness

Maintaining soundness in a JavaScript static analysis is a formidable challenge. Our position is that use analysis can be used to augment both a sound and an unsound underlying pointer analysis. In practice, however, a sound yet precise pointer analysis for JavaScript is exceedingly difficult to create for realistically-sized programs. Dynamic language features present a significant challenge.

Dynamic code loading is widespread, leading to the need for a hybrid static/runtime analysis. Even if eval is uncommon, computed properties such as a[p+q]= . . . lead to dramatic loss of precision.

The execution environment presents a variety of unexpected ways to either introduce code at runtime (such as Function, setTimeout, etc.) or cross heap boundaries through the use of arguments:callee, with, the global object, etc.

Language subsets have been proposed as a way to control unsoundness, however, in practice only small programs fit into these subsets.

JavaScript semantics are complicated, leading to attempts both to formalize it and to dismantle JavaScript into manageable elements. Yet, none of these approaches combine the practicality and correctness properties that would enable large-scale sound analysis.

The approach described hereinafter, therefore, is to propose an analysis which, while it may be used in a sound setting with the right assumptions, is largely evaluated for its practical utility on important benchmarks.

2. Overview

Figure 7:
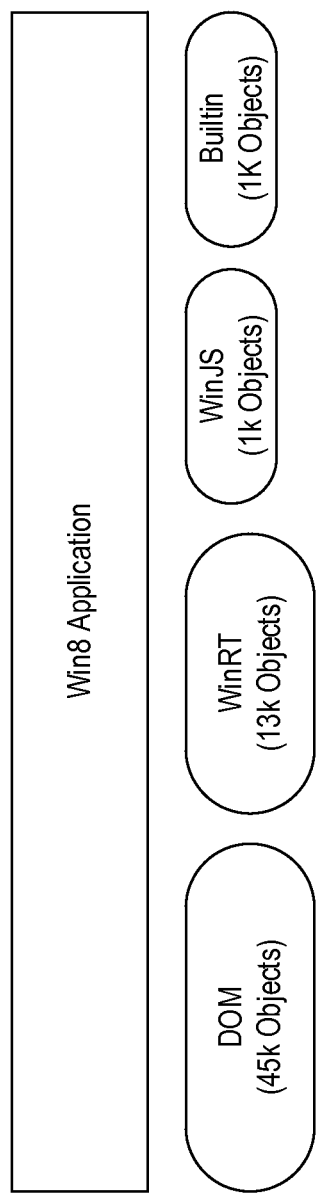
FIG. 7 illustrates an example composition of a WINDOWS 8 JavaScript application is illustrated in FIG. 7.

The composition of a WINDOWS 8 (or Win8) JavaScript application is illustrated in FIG. 7. These are frequently complex applications that are not built in isolation: in addition to resources such as images and HTML, Win8 applications depend on a range of JavaScript libraries for communicating with the DOM, both using the built-in JavaScript DOM API and rich libraries such as jQuery and WinJS (an application framework and collection of supporting APIs used for Windows 8 HTML development), as well as the underlying WINDOWS runtime.

2.1 Analysis Overview

Despite having incomplete information about this extensive library functionality, much can be discerned from observing how developers use library code. For example, if there is a call whose base is a variable obtained from a library, the variable refers to a function for the call to succeed. Similarly, if there is a load whose base is a variable returned from a library call, the variable refers to an object that has that property for the load to succeed.

Figure 8:
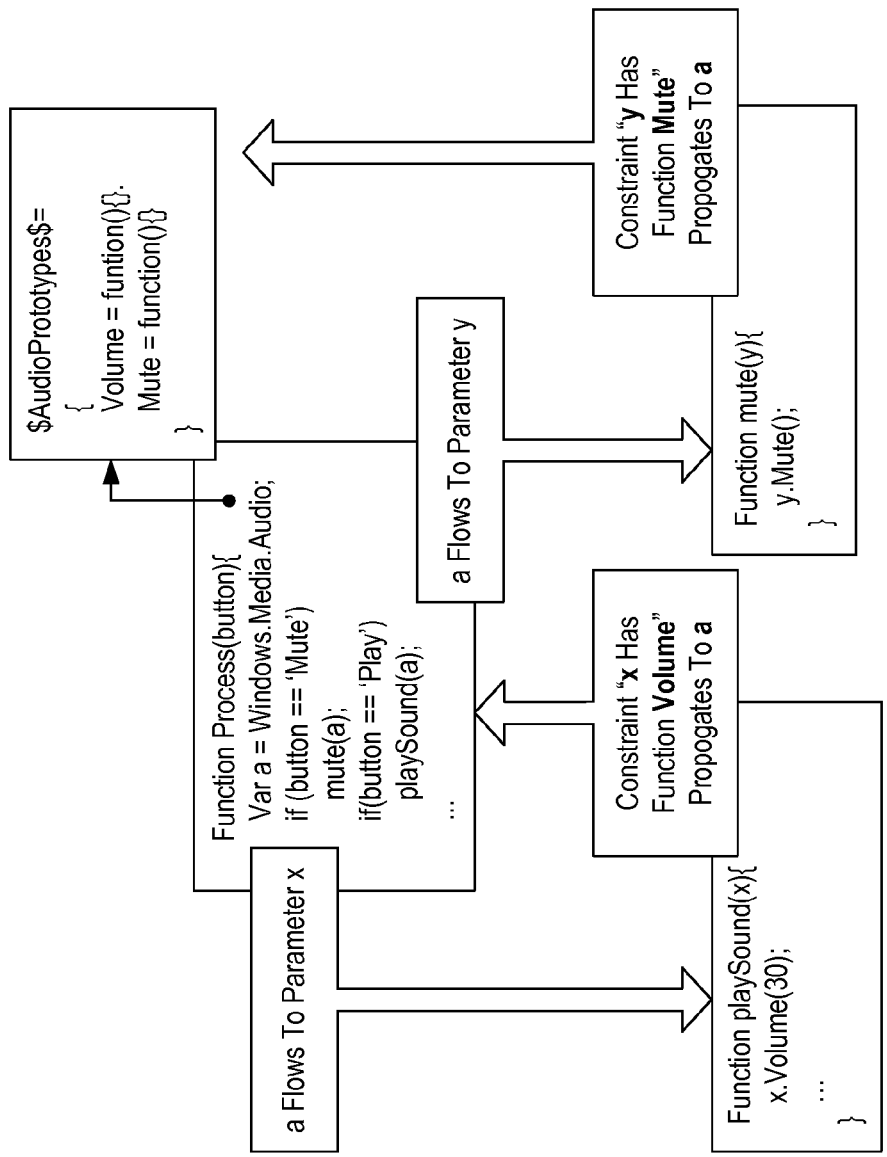
FIG. 8 illustrates a summary connection between concrete pointer analysis and use analysis.

A summary of the connection between the concrete pointer analysis and use analysis described herein is graphically illustrated in FIG. 8. In this example, function process invokes functions mute and playSound, depending on which button has been pressed. Both callees accept variable a, an alias of a library-defined Windows:Media:Audio, as a parameter. The arrows in FIG. 8 represent the flow of constraints.

Points-to analysis (downward arrows) flows facts from actuals to formals—functions receive information about the arguments passed into them, while the use analysis (upward arrows) works in the opposite direction, flowing demands on the shape of objects that are passed in from formals to actuals.

Specifically, the points-to analysis flows variable a, defined in process, to formals x and y. Within functions playSound and mute, it can be seen that these formal arguments must have functions Volume and Mute defined on them, which flows back to the library object that variable a must point to. Its shape as a result must contain at least functions Volume and Mute.

Use analysis: The notion of use analysis above leads us to an inference technique, which comes in two flavors: partial and full.

Partial inference assumes that stubs for libraries are available. Stubs are not required to be complete implementations, instead, function implementations are frequently completely omitted, leading to missing data flow. What is required is that all objects, functions and properties exposed by the library are described in the stub. Partial inference solves the problem of missing flow between library and application code by linking together objects of matching shapes, a process called unification (described in section 3.3 below).

Full inference is similar to partial inference, but goes further in that it does not depend on the existence of any stubs. Instead, it attempts to infer library APIs based on uses found in the application. Paradoxically, full inference is often faster than partial inference, as it does not need to analyze large collections of stubs, which is also wasteful, as a typical application only requires a small portion of them.

In the rest of section 2, concepts related to the analysis are built up. Precise analysis details are found in Section 3.

Library stubs: Stubs are commonly used for static analysis in a variety of languages, starting from libc stubs for C programs, to complex and numerous stubs for JavaScript built-ins and DOM functionality.

The following code is an example of stubs from the WinRT library.

```
Windows.Storage.Stream.FileOutputStream = function( ) { };
Windows.Storage.Stream.FileOutputStream.prototype = {
    writeAsync = function( ) { },
    flushAsync = function( ) { },
    close = function( ) { }
}
```

Note that stub functions are empty. This stub models the structure of the FileOutputStream object and its prototype object. It does not, however, capture the fact that writeAsync and flushAsync functions return an AsyncResults object. Use analysis can, however, discover this if we consider the following code:

```
var s = Windows.Storage.Stream;
var fs = new s.FileOutputStream(...)
```

-continued

```
fs.writeAsync(...).then(function( ) {
    ...
});
```

We can observe from this that fs:writeAsync should return an object whose then argument is a function. These facts allow us to unify the return result of writeAsync with the Promise object, the prototype of the Promise object declared in the WinJS library.

2.2 Symbolic Locations and Unification

Abstract locations are typically used in program analyses such as a points-to analysis to approximate objects allocated in the program at runtime. We employ the allocation site abstraction as an approximation of runtime object allocation (denoted by domain H in our analysis formulation). In this description, partial and full inference scenarios are considered.

It is useful to distinguish between abstract locations in the heap within the application (denoted as $H_A$) and those within libraries (denoted as $H_L$). Additionally, a set of symbolic locations $H_S$ is maintained; these are used for reasoning about results returned by library calls. In general, both library and application abstract locations may be returned from such a call.

It is instructive to consider the connections between the variable V and heap H domains. FIG. 9A shows a connection between variables and the heap $H=H_A \cup H_S \cup H_L$ in the context of partial inference. FIG. 9B shows a similar connection between variables and the heap $H=H_A \cup H_S$ in the context of full inference, which lacks $H_L$. Variables within the V domain have points-to links to heap elements in H; H elements are connected with points-to links that have property names.

Since at runtime actual objects are either allocated within the application ($H_A$) or library code ($H_L$), the symbolic locations $H_S$ is unified with those in $H_A$ and $H_L$.

2.3 Inference Algorithm

Because of missing interprocedural flow, a fundamental problem with building a practical and usable points-to analysis is that sometimes variables do not have any abstract locations that they may point to. Of course, with the exception of dead code or variables that only point to null and undefined, this is a static analysis artifact. In the presence of libraries, several distinct scenarios lead to 1) dead returns: when a library function stub lacks a return value; 2) dead arguments: when a callback within the application is passed into a library and the library stub fails to properly invoke the callback; and 3) dead loads: when the base object reference (receiver) has no points-to targets.

Strategy: The overall strategy described herein is to create symbol locations for all the scenarios above. To do this, an iterative algorithm is employed. At each iteration, a points-to analysis pass is run and then proceed to collect dead arguments, returns, and loads, introducing symbol locations for each. A unification step is then performed, where symbolic locations are unified with abstract locations. A detailed description of this process is given in Section 3.

Iterative solution: An iterative process is used because new points-to targets in the process of unification may be discovered on each successive pass. As the points-to relation grows, additional dead arguments, returns, or loads are generally discovered, leading to further iterations. Iteration is terminated when the iteration can no longer find dead arguments, dead returns, or dead loads. Note that the only algorithmic change for full analysis is the need to create symbolic locations for dead loads.

Unification strategies: Unification is the process of linking or matching symbolic locations with matching abstract locations. In Section 3.3, three strategies will be explored: unify based on matching of a single property, all properties, and prototype-based unification.

3. Techniques

The techniques described herein are based on pointer analysis and use analysis. The pointer-analysis is a flow and context-insensitive subset-based. The analysis is field-sensitive, meaning that it distinguishes properties of different abstract objects. The call-graph is constructed on-the-fly because JavaScript has higher-order functions, and so the points-to and call graph relations are mutually dependent. The use analysis is based on unification of symbolic and abstract locations based on property names.

3.1 Pointer Analysis

The input program is represented as a set of facts in relations of fixed arity and type summarized in FIG. 10 and described below. Relations use the following domains: heap-allocated objects and functions H, program variables V, call sites C, properties P, and integers Z.

The pointer analysis implementation is formulated declaratively using Datalog, as has been done in range of prior projects. The JavaScript application is first normalized and then converted into a set of facts. These are combined with Datalog analysis rules resolved using the Microsoft Z3 fixpoint solver. The most important definitions used for program representation are described below.

Assign(v1; v2) represents an assignment from v2 into v1. We use Assign to model JavaScript assignments, but also for linking actual argument values to formal arguments, and actual return values to formal returns.

NewObj(v; h; f) represents the creation of an object at allocation site h which is stored in variable v and f is a variable holding the constructor function. Each syntactic new-statement has its own allocation site. Furthermore each function declaration or expression has an associated allocation site for its prototype object. Finally, we have allocation sites for built-in objects such as the global object, the Array object (and its prototype), the String object (and its prototype) and so on.

Load(v1; v2; p) represents a load from property p. In JavaScript this corresponds to expressions such as v1=v2:p. Qualified expressions, such as foo:bar:baz, are broken into several atomic Load facts by introducing temporary variables. The LoadDynamic(v1; v2) constraint represents a dynamic or computed property, i.e. a load where the property name is not known syntactically, which is helpful for modeling arrays.

Store(v1; p; v2) is similar to Load and represents JavaScript expressions such as v1:p=v2. Likewise StoreDynamic (v1; v2) represents a dynamic store where the property name is not known.

FormalArg(f; i; v), ActualArg(c; i; v), FormalRet(f; v) and ActualRet(c; v) are used for modeling argument passing and function returns. A FormalArg(f; i; v) fact represents that the i'th argument of function f is read from v. Similarly, ActualArg(c; i; v) represents that the i'th actual argument at call site c is stored in v. If a function flows to a call site c these facts are linked together using Assign. The FormalRet and ActualRet facts are used in a similar way.

Prototype(h1; h2) states that the internal prototype of h1 may be h2. Note that the loads/stores to the external prototype property are handled using regular Load and Store facts.

Rules for the Andersen-style inclusion-based points-to analysis are shown in FIG. 11A. Example rules for use analysis are shown in FIG. 11B.

In the rest of this section, we shall use the $\forall$ quantifier and => implication connectives in our Datalog rules to ease presentation. While these connectives are usually not supported in Datalog engines, they can be encoded as follows:
C(x; z):-$\forall$ y:A(x; y)=>B(y, z).
is equivalent to the datalog rules:
N(x; z):- $\forall$ A(x, y), ¬B(y, z).
C(x; z):- $\forall$ A(x, y), B(y; z), ¬N(x, z).

3.2 Extending with Partial Inference

We now describe how the basic pointer analysis can be extended with use analysis in the form of partial inference. In partial inference we assume the existence of stubs that describe all objects, functions and properties. Function implementations, as stated before, may be omitted. The purpose of partial inference is to recover missing flow due to missing implementations. Flow may be missing in three different places: arguments, return values, and loads.

DeadLoad(h : H, p : P) where h is an abstract location and p is a property name, records that property p is accessed from h, but h lacks a p property. We capture this with the rule:
DeadLoad(h, p):- Load(v1, v2, p),
 PointsTo(v2, h),
 ¬ HasProperty(h, p),
 AppVar(v1),
 AppVar(v2).

Here the PointsTo(v2, h) constraint ensures that the base object is resolved. The two AppVar constraints ensure that the load actually occurs in the application code and not the library code.

DeadArgument(f: H, i: Z) where f is a function and I is an argument index records that the i'th argument has no value. We capture this with the rule:
DeadArgument(f, i):- FormalArg(f, I, v),
 ¬ ResolvedVariable(v),
 AppAlloc(f).
 z>1:

Here the AppAlloc constraint ensures that the argument occurs in a function within the application code, and not in the library code; argument counting starts at 1.

DeadReturn(c: C, v: V), where c is a call site and v is the result value, records that the return value for call site c has no value, and is captured by the following rule.
DeadReturn(c, v2):- ActualArg(i, 0, v1),
 PointsTo(v1, f),
 ActualRet(i, v2),
 ¬ ResolvedVariable(v2),
 ¬ AppAlloc(f).

Here the PointsTo(v1, f) constraint ensures that the call site has call targets. The ¬ AppAlloc(f) constraint ensures that the function called is not an application function, but either (a) a library function or (b) a symbolic location.

We use these relations to introduce symbolic locations into PointsTo, HeapPtsTo, and Prototype as shown in FIG. 12. In particular for every dead load, dead argument and dead return we introduce a fresh symbolic location. We restrict the introduction of dead loads by requiring that the base object is not a symbolic object, unless we are operating in full inference mode. This means that every load must be unified with an abstract object, before we consider further unification for properties on that object. In full inference we have to drop this restriction, because not all objects are known to the analysis.

3.3 Unification

Unification is the process of linking or matching symbolic locations s with matching abstract locations l. The simplest form of unification is to do no unification at all. In this case, no actual flow is recovered in the application. Below we explore unification strategies based on property names.

∃ shared properties: A choice here is to link objects which share at least one property. Unfortunately, with this strategy, most objects quickly become linked. Especially problematic are properties with common names, such as length or toString, since all objects have the latter property.

∀ shared properties: We can improve upon this strategy by requiring that the linked object must have all properties of the symbolic object. This drastically cuts down the amount of unification, but because the shape of s is an over-approximation, requiring all properties to be present may link to too few objects, introducing unsoundness. It can also introduce imprecision: if we have s with function trim( ), we will unify s to all string constants in the program.

The purpose of unification is to recover dead flow by linking symbolic locations to abstract locations. We unify a symbolic location with an abstract location when all the properties accessed from the symbolic location are available on the abstract location. We begin by defining the relation:
CandidateObject(h1, h2):- DeadLoad(h1, p),
   HasProperty(h2, p),
   Symbolic(h1),
   ¬ Symbolic(h2),
   ¬ HasDynamicProps(h1),
   ¬ HasDynamicProps(h2),
   ¬ SpecialProperty(p).

This expresses which symbolic and abstract locations h1 and h2 are candidates for unification. First, we require that the symbolic and abstract location share at least one property. Second, we require that neither the symbolic nor the abstract object have dynamic properties. Third, we disallow commonly-used properties, such as prototype and length, as evidence for unification. The relation below captures when two locations h1 and h2 are unified:
UnifyObject(h1, h2):- CandidateObject(h1, h2),
   ∀ p:DeadLoad(h1, p)=>
     HasProperty(h2, p).

This states that h1 and h2 must be candidates for unification and that if a property p is accessed from h1 then that property must be present on h2. If h1 and h2 are unified then the HeapPtsTo relation is extended such that any place where h1 may occur h2 may now also occur.

Prototype-based unification: Instead of attempting to unify with all possible abstract locations l, an often better strategy is to only unify with those that serve as prototype objects. Such objects are used in a two-step unification procedure: first, we see if all properties of a symbolic object can be satisfied by a prototype object, if so we unify them and stop the procedure. If not, we consider all non-prototype objects. We take the prototype hierarchy into consideration by unifying with the most precise prototype object.

The following example illustrates how this can improve precision:

```
var firstName = "Lucky";
var lastName = "Luke";
var favoriteHorse = "Jolly Jumper";
function compareIgnoreCase(s1, s2) {
    return s1.toLowerCase( ) < s2.toLowerCase( );
}
```

Here we have three string constants and a comparator function. Assume that the comparator is passed into a library as a callback. In this case the pointer analysis does not know what the two arguments s1 and s2 may point to, but the use analysis knows that these arguments must have a toLowerCase property. The unification, described so far, would continue by linking the arguments to all abstract locations which have the toLowerCase property.

Unfortunately, all string constants have this property, so this over-approximation is overly imprecise. We obtain better unification by first considering prototype objects. In this case we discover that the String[Proto] object has the toLowerCase property. In prototype-based unification, we merely conclude that the prototype of s1 and s2 must be StringJProtoK.

In the above discussion we did not precisely define what we consider to be prototype objects: we consider all objects which may flow to the prototype property of some object to be prototype objects. Furthermore built-in prototype objects, such as Array and String, are known to be prototype objects. This is captured by the PrototypeObj rule.

One issue remains: What if multiple prototype objects are possible for unification? In this case we select the most precise object in the prototype hierarchy, i.e. the object that is highest in the prototype chain. This rule captures the fact that it is possible to unify h1 with h2, but there is also some h3 in the prototype chain of h2 that could be unified with h1. This means that h1 and h2 should not be unified.
NoLocalMatch(h1, h2):—
   Prototype(h2, h3),
   ∀ p:DeadLoad(h1, p)=>HasProperty(h2, p),
   ∀ p:DeadLoad(h1, p)=>HasProperty(h3, p),
   CandidateProto(h1, h2),
   CandidateProto(h1, h3),
   h2≠h3.

We can define prototype-based unification as
UnifyProto(h1, h2):—
   ¬ NoLocalMatch(h1, h2),
   CandidateProto(h1, h2).
   ∀ p:DeadLoad(h1, p)=>HasProperty(h2, p).

The above captures that h1 and h2 are compatible and there is no matching object in the prototype chain of h2.

3.4 Extending with Full Inference

As shown in the pseudo-code in FIG. 12, we can extend the analysis to support full inference with a simple change. Recall that, in full inference we do not assume the existence of any stubs, and the application is analyzed completely by itself. We implement this by dropping the restriction that symbolic locations are only introduced for non-symbolic locations. Instead we will allow a property of a symbolic location to point to another symbolic location.

Introducing these symbolic locations will resolve a load, and in doing so potentially resolve the base of another load. This is in turn may cause another dead load to appear for that base object. In this way the algorithm can be viewed as a frontier expansion along the known base objects. At each iteration the frontier is expanded by one level. This process cannot go on forever, as there is only a fixed number of loads, and thereby dead loads, and at each iteration at least one dead load is resolved.

Accordingly, the principles described herein provide for complex and robust analysis of dynamic code. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer program product comprising one or more computer storage media having thereon computer-executable instructions that are structured such that, when executed by the one or more processors of a computing system, causes the computing system to perform a method for generating a plurality of overlaid dependency graphs for code that includes a plurality of code portions, the method comprising acts of:

accessing a first plurality of nodes that each comprises a data structure corresponding to a code portion of the plurality of code portions represented by the first plurality of nodes;

for the first plurality of nodes, generating a higher level dependency graph by performing the following further acts:

calculating a dependency for one more nodes of the first plurality of nodes by determining that said one or more nodes are depending nodes that correspond to a depending code portion that depends on an affecting code portion corresponding to an affecting node that is included among the first plurality of nodes;

recording the dependency in a manner associated with each node in the first plurality of nodes for which a dependency is calculated; and recording a method of dependency calculation in a manner associated with each calculated dependency for said one or more nodes of the first plurality of nodes;

accessing a second plurality of nodes that each comprises a data structure corresponding to a code portion of the plurality of code portions represented by the second plurality of nodes;

for the second plurality of nodes, generating a lower level dependency graph by performing the following further acts:

calculating a dependency for one more nodes of the second plurality of nodes by determining that said one or more nodes are depending nodes that correspond to a depending code portion that depends on an affecting code portion corresponding to an affecting node that is included among the second plurality of nodes;

recording the dependency in a manner associated with each node in the second plurality of nodes for which a dependency is calculated; and recording a method of dependency calculation in a manner associated with each calculated dependency for said one or more nodes of the second plurality of nodes;

wherein the lower level dependency graph represents dependency relationships contained within at least one node of the first plurality of nodes, so that the lower level dependency graph is overlaid by the higher level dependency graph; and wherein at least one of the higher or lower level dependency graphs is generated in two phases, and wherein during the first phase the generated dependency graph is first generated prior to runtime and the graph dependencies are calculated based on static analysis, and during the second phase the generated dependency graph is updated based on dependencies calculated using dynamic analysis during a runtime.

2. The computer program product in accordance with claim 1, wherein at least one of the first or second plurality of nodes comprise a first set of nodes belonging to a first domain, and a second set of nodes belonging to a second domain, wherein the act of calculating a dependency, the act of recording the dependency, and the act of recording a method of dependency calculation are performed for at least one given node corresponding to a depending code portion in the first code domain, and for at least one give node corresponding to a depending code portion in the second code domain, wherein the method of dependency calculation for the depending code portion in the first code domain is different than the method of dependency calculation for the depending code portion in the second domain.

3. The computer program product in accordance with claim 2, wherein the first code domain is a static language code domain, and the second code domain is a dynamic language code domain.

4. The computer program product in accordance with claim 2, wherein the first code domain is an application domain, and the second code domain is an operating system domain.

5. The computer program product in accordance with claim 1, wherein at least some of the nodes of said first or second plurality of nodes comprise functions.

6. The computer program product in accordance with claim 1, wherein at least some of the nodes of said first or second plurality of nodes comprise resources.

7. The computer program product in accordance with claim 1, wherein the first plurality of nodes contained in the higher level dependency graph comprise resources and wherein the second plurality of nodes that are contained in the lower level dependency graph overlaid by the higher level dependency graph comprise functions.

8. The computer program product in accordance with claim 1, wherein at least some of the nodes of said first or second plurality of nodes represent dynamic code portions.

9. The computer program product in accordance with claim 1, wherein the act of calculating the dependency for one or more nodes of least one of said first or second plurality of nodes comprises determining one or more properties for said one or more nodes.

10. The computer program product in accordance with claim 9, wherein the determined one or more properties for said one or more nodes also includes a content characteristic of the depending code portion for said one or more nodes.

11. The computer program product in accordance with claim 9, wherein the determined one or more properties for said one or more nodes also includes a predicted consequence of executing the depending code portion for said one or more nodes.

12. The computer program product in accordance with claim 9, wherein the determined one or more properties for said one or more nodes also includes a language use characteristic of the depending code portion for said one or more nodes.

13. The computer program product in accordance with claim 9, wherein the determined one or more properties for said one or more nodes also includes source characteristics of the depending code portion for said one or more nodes.

14. The computer program product in accordance with claim 9, further comprising an act of recording how the determined one or more properties for said one or more nodes was calculated.

15. The computer program product in accordance with claim 14, further comprising an act of recording a confidence level in how the determined one or more properties for said one or more nodes was calculated.

16. The computer program product in accordance with claim 14, further an act of recording a soundness level in how the determined one or more properties for said one or more nodes was calculated.

17. The computer program product in accordance with claim 9, further comprising an act of recording one or more conditions of the determined one or more properties for said one or more nodes.

18. A computer-implemented method for generating a plurality of overlaid dependency graphs for code that includes a plurality of code portions, the method comprising acts of:
- accessing a first plurality of nodes that each comprises a data structure corresponding to a code portion of the plurality of code portions represented by the first plurality of nodes;
- for the first plurality of nodes, generating a higher level dependency graph by performing the following further acts:
  - calculating a dependency for one more nodes of the first plurality of nodes by determining that said one or more nodes are depending nodes that correspond to a depending code portion that depends on an affecting code portion corresponding to an affecting node that is included among the first plurality of nodes;
  - recording the dependency in a manner associated with each node in the first plurality of nodes for which a dependency is calculated; and
  - recording a method of dependency calculation in a manner associated with each calculated dependency for said one or more nodes of the first plurality of nodes;
- accessing a second plurality of nodes that each comprises a data structure corresponding to a code portion of the plurality of code portions represented by the second plurality of nodes;
- for the second plurality of nodes, generating a lower level dependency graph by performing the following further acts:
  - calculating a dependency for one more nodes of the second plurality of nodes by determining that said one or more nodes are depending nodes that correspond to a depending code portion that depends on an affecting code portion corresponding to an affecting node that is included among the second plurality of nodes;
  - recording the dependency in a manner associated with each node in the second plurality of nodes for which a dependency is calculated;
  - recording a method of dependency calculation in a manner associated with each calculated dependency for said one or more nodes of the second plurality of nodes; and
- wherein the lower level dependency graph represents dependency relationships contained within at least one node of the first plurality of nodes, so that the lower level dependency graph is overlaid by the higher level dependency graph; and
- wherein at least one of the higher or lower level dependency graphs is generated in two phases, and wherein during the first phase the generated dependency graph is first generated prior to runtime and the graph dependencies are calculated based on static analysis, and during the second phase the generated dependency graph is updated based on dependencies calculated using dynamic analysis during a runtime.

19. The computer-implemented method of claim 18 wherein at least one of the first or second plurality of nodes comprise a first set of nodes belonging to a first domain, and a second set of nodes belonging to a second domain.

20. The computer-implemented method of claim 19 wherein calculating the dependency for a node uses a different calculation method depending on whether a node is in said first set nodes belonging to said first domain, or is in said second set nodes belonging to said second domain.

21. The computer-implemented method of claim 20 wherein said first said nodes in said first domain represent code portions created from a static language program and said nodes in said second domain represent code portions created from a dynamic language program.

22. The computer-implemented method of claim 20 wherein said first said nodes in said first domain represent code portions of an application program and said nodes in said second domain represent code portions of an operating system.

23. The computer-implemented method in accordance with claim 18, wherein the first plurality of nodes contained in the higher level dependency graph comprise resources and wherein the second plurality of nodes that are contained in the lower level dependency graph overlaid by the higher level dependency graph comprise functions.

24. A computer-implemented method for generating a plurality of overlaid dependency graphs for code that includes a plurality of code portions, the method comprising acts of:
- accessing a first plurality of nodes that each comprises a data structure corresponding to a code portion of the plurality of code portions represented by the first plurality of nodes;
- for the first plurality of nodes, generating a higher level dependency graph by performing the following further acts:
  - calculating a dependency for one more nodes of the first plurality of nodes by determining that said one or more nodes are depending nodes that correspond to a depending code portion that depends on an affecting code portion corresponding to an affecting node that is included among the first plurality of nodes;
  - recording the dependency in a manner associated with each node in the first plurality of nodes for which a dependency is calculated; and
  - recording a method of dependency calculation in a manner associated with each calculated dependency for said one or more nodes of the first plurality of nodes;
- accessing a second plurality of nodes that each comprises a data structure corresponding to a code portion of the plurality of code portions represented by the second plurality of nodes;
- for the second plurality of nodes, generating a lower level dependency graph by performing the following further acts:
  - calculating a dependency for one more nodes of the second plurality of nodes by determining that said one or more nodes are depending nodes that correspond to a depending code portion that depends on an affecting code portion corresponding to an affecting node that is included among the second plurality of nodes;
  - recording the dependency in a manner associated with each node in the second plurality of nodes for which a dependency is calculated; and
  - recording a method of dependency calculation in a manner associated with each calculated dependency for said one or more nodes of the second plurality of nodes; and
- wherein the lower level dependency graph represents dependency relationships contained within at least one node of the first plurality of nodes, so that the lower level dependency graph is overlaid by the higher level dependency graph;
- wherein at least one of the higher or lower level dependency graphs is generated in two phases, and during the first phase the generated dependency graph is first generated prior to runtime and the graph dependencies are calculated based on static analysis, and during the second phase the generated dependency graph is updated based on dependencies calculated using dynamic analysis during a runtime; and wherein at least one of the first or second plurality of nodes comprise a first set of nodes belonging to a first domain, and a second set of nodes belonging to a second domain, and calculating the dependency for a node uses a different calculation method depending on whether a node is in said first set nodes belonging to said first domain, or is in said second set of nodes belonging to said second domain.

* * * * *